US012794149B2

(12) United States Patent
Rambow et al.

(10) Patent No.: US 12,794,149 B2
(45) Date of Patent: Nov. 10, 2026

(54) CONTACT ARRANGEMENT, ELECTRICAL COMPONENT WITH A CONTACT ARRANGEMENT, AND ELECTRICAL DEVICE

(71) Applicants: TDK Electronics AG, Munich (DE); Semikron Danfoss Elektronik GmbH & Co. KG, Nuremberg (DE)

(72) Inventors: Wolfgang Rambow, Essen (DE); Karl Niklas, Königsbronn-Itzelberg (DE); Peter Beckedahl, Oberasbach (DE); Ingo Bogen, Nuremberg (DE)

(73) Assignee: TDK Electronics AG, Munich (DE)

(*) Notice: Subject to any disclaimer, the term of this patent is extended or adjusted under 35 U.S.C. 154(b) by 244 days.

(21) Appl. No.: 18/717,392

(22) PCT Filed: Dec. 7, 2022

(86) PCT No.: PCT/EP2022/084754
§ 371 (c)(1),
(2) Date: Jun. 7, 2024

(87) PCT Pub. No.: WO2023/104867
PCT Pub. Date: Jun. 15, 2023

(65) Prior Publication Data

US 2025/0047014 A1 Feb. 6, 2025

(30) Foreign Application Priority Data

Dec. 10, 2021 (DE) ......................... 102021132667.2

(51) Int. Cl.
*H01R 4/02* (2006.01)
*H01G 4/236* (2006.01)
*H01R 43/02* (2006.01)

(52) U.S. Cl.
CPC ............ *H01R 4/027* (2013.01); *H01G 4/236* (2013.01); *H01R 43/0263* (2013.01)

(58) Field of Classification Search
CPC .... H01R 4/027; H01R 43/0263; H01R 12/52; H01R 12/7082; H01R 12/57; H01G 4/236;
(Continued)

(56) References Cited

U.S. PATENT DOCUMENTS

| | | | |
|---|---|---|---|
| 2002/0025709 | A1 | 2/2002 | Murakami |
| 2011/0149472 | A1 | 6/2011 | Yang et al. |

(Continued)

FOREIGN PATENT DOCUMENTS

| | | | |
|---|---|---|---|
| CN | 111403174 | A | 7/2020 |
| DE | 102018219218 | A1 | 5/2020 |

(Continued)

OTHER PUBLICATIONS

Semikron International Gmbh, "Electric and Electrified Vehicles; Power Electronics for Vehicles", Brochure, Nuremberg, Germany, Mar. 2021, Total pp. 16.

(Continued)

*Primary Examiner* — Travis S Chambers
(74) *Attorney, Agent, or Firm* — Slater Matsil, LLP

(57) ABSTRACT

In an embodiment a contact arrangement includes a first contact element with a first guide portion and a first contact portion and a second contact element with a second guide portion and two second contact portions, wherein the first and second guide portions lie one over the other, overlap in a vertical direction, and extend along a longitudinal direction perpendicular to the vertical direction, wherein the first contact portion follows the first guide portion in the longitudinal direction, and wherein the two second contact portions are arranged adjacent to the first and second guide (Continued)

portions symmetrically along a transversal direction that is perpendicular to the longitudinal direction and to the vertical direction.

20 Claims, 8 Drawing Sheets

(58) Field of Classification Search
CPC .......... H01G 2/103; H01G 2/106; H01G 2/08; H01G 4/228; H01G 4/38; H01G 4/40
See application file for complete search history.

(56) References Cited

U.S. PATENT DOCUMENTS

| | | | |
|---|---|---|---|
| 2014/0118909 | A1 | 5/2014 | Matsuno et al. |
| 2020/0321589 | A1 | 10/2020 | Watahiki et al. |
| 2023/0014821 | A1 | 1/2023 | Iwata et al. |
| 2023/0187135 | A1 | 6/2023 | Paesler et al. |

FOREIGN PATENT DOCUMENTS

| | | | | | |
|---|---|---|---|---|---|
| DE | 102020206364 | A1 | | 11/2021 | |
| DE | 102025112703 | B3 | * | 2/2026 | H01G 2/106 |
| EP | 0281926 | A1 | | 9/1988 | |
| JP | 2002034135 | A | | 1/2002 | |
| JP | 3637846 | B2 | * | 4/2005 | |
| JP | 2012056118 | A | | 3/2012 | |
| JP | 2014090538 | A | | 5/2014 | |
| JP | 2017197830 | A | | 11/2017 | |
| TW | I846757 | B | * | 7/2024 | H05K 5/0026 |
| WO | 2019069837 | A1 | | 4/2019 | |
| WO | 2021131155 | A1 | | 7/2021 | |

OTHER PUBLICATIONS

Infineon Technologies Ag, “An DC6i Assembly; Assembly instructions for the HybridPACK™ DC6i”, Munich, Germany, Dec. 7, 2023, Total pp. 28.

Infineon Technologies Ag, “FS400R07A3E3 HybridPACK™ DC6 module; HybridPACK™ DC6 module with Trench/ Fieldstop IGBT3 and emitter controlled 3 diode and NTC”, Munich, Germany, Dec. 21, 2021, Total pp. 15.

Infineon Technologies Ag, “HybridPACK™ DC6 family”, Product brief, Munich, Germany, Jul. 2020, Total pp. 02.

Infineon Technologies Ag, “HybridPACK™ Drive 750 V; FS820R08A6P2x, FS660R08A6P2Fx, FS770R08A6P2x, FS950R08A6P2x”, Product brief, Munich, Germany, Jun. 2019, Total pp. 02.

Infineon Technologies Ag, “HybridPACK™ Drive 1200 V; FS380R12A6T4x”, Product brief, Munich, Germany, Apr. 2019, Total pp. 02.

Infineon Technologies Ag, “An-HPD-Assembly; Assembly instructions for the HybridPACK™ Drive”, Munich, Germany, Jan. 23, 2024, Total pp. 57.

Infineon Technologies Ag, “HybridPACK™ Drive; FS820R08A6P2B (lead type with PinFin baseplate)”, Product brief, Neubiberg, Germany, Apr. 2016, Total pp. 02.

Infineon Technologies Ag, “HybridPACKTM 1; Power Module for Hybrid- and Electric Vehicles”, Product brief, Neubiberg, Germany, Mar. 2012, Total pp. 02.

* cited by examiner

CONTACT ARRANGEMENT, ELECTRICAL COMPONENT WITH A CONTACT ARRANGEMENT, AND ELECTRICAL DEVICE

CROSS-REFERENCE TO RELATED APPLICATIONS

This patent application is a national phase filing under section 371 of PCT/EP2022/084754, filed Dec. 7, 2022, which claims the priority of German patent application 102021132667.2, filed Dec. 10, 2021, each of which is incorporated herein by reference in its entirety.

TECHNICAL FIELD

A contact arrangement, an electrical component with a contact arrangement and an electrical device are specified.

BACKGROUND

The connection of modern low-inductance semiconductor modules, for example with DC link capacitors or other passive components such as busbars, EMI filters (EMI: electromagnetic interference) or combinations thereof, has so far usually been carried out via parallel connection lugs or busbars with screw connections, which typically have a design-related apparent inductance in the range of more than 15 nH and a relatively high apparent resistance.

SUMMARY

Embodiments provide a contact arrangement for an electrical component. Further embodiments provide an electrical component with a contact arrangement and an electrical device.

According to an embodiment, a contact arrangement comprises a first and a second contact element. According to a further embodiment, an electrical component comprises such a contact arrangement. The contact arrangement is intended and configured for electrical contacting of the electrical component, i.e., for an electrical connection of the electrical component to a further component. Furthermore, it can also be possible to mechanically fasten the electrical component via the contact arrangement. The electrical component can also have one or more contact arrangements, which can preferably be embodied similarly and via which the electrical component can be connected to one or more further electrical components.

According to a further embodiment, each of the contact elements has a guide portion and at least one contact portion. A contact element can be mechanically and electrically conductively connected to an external connection point, in particular an electrical connection point of another component, via the at least one contact portion. The at least one contact portion of each of the contact elements can, in particular, be arranged outside a housing of the electrical component. The at least one contact portion of each of the contact elements can be connected to one or more other components of the electrical component via the guide portion. The guide portion of each of the contact elements can, in particular, be arranged at least partially outside a housing of the electrical component.

According to a further embodiment, the first contact element comprises a first guide portion and the second contact element comprises a second guide portion. Furthermore, the first contact element comprises a first contact portion. Particularly preferably, the second contact element comprises two second contact portions.

The electrical component can, for example, comprise or be at least one capacitor and/or a filter element. For example, the capacitor may be an intermediate circuit capacitor, also known as a DC link capacitor, which is based on a film, aluminum or ceramic technology or a hybrid technology, for example an aluminum/film technology. The filter element can be an EMI filter, for example, or at least components of a filter. Furthermore, interference suppression components installed on or attached to a busbar and other passive components are also possible, for example.

According to a further embodiment, an electrical device comprises an electrical component with a contact arrangement. In particular, the electrical device can comprise a further electrical component to which the electrical component with the contact arrangement is electrically connected. Accordingly, the electrical device can comprise at least one electrical component and at least one further electrical component, wherein the further electrical component has connection points which are mechanically and electrically connected to the first contact portion and the second contact portions of the at least one contact arrangement of the electrical component. Furthermore, the at least one electrical component and the at least one further electrical component can be mounted on a common carrier, such as a heat sink.

The previous and following description refers equally to the contact arrangement, the electrical component with the contact arrangement and the electrical device with the electrical component.

According to a further embodiment, the first and second contact elements are arranged one above the other in a vertical direction. In particular, this can mean that the first and second guide portions are arranged one above the other and overlap in the vertical direction. If the contact arrangement is viewed along the vertical direction, one of the contact elements is thus arranged below the other contact element. In other words, when viewed in this way along the vertical direction, one of the two guide portions is arranged under the other guide portion. In particular, one of the guide portions can at least partially or even completely conceal the other guide portion when looking at the contact arrangement along the vertical direction.

The first contact portion can particularly preferably follow the first guide portion along a longitudinal direction that is perpendicular to the vertical direction. For this purpose, the first contact portion can be directly connected to the first guide portion. Alternatively, for example, a transition portion may be present between the first guide portion and the first contact portion. The spatial arrangement of the first guide portion and the first contact portion connected to it can thus define the longitudinal direction. The longitudinal direction can, for example, be perpendicular to a housing portion of the housing of the electrical component from which the contact arrangement protrudes.

According to a further embodiment, the two second contact portions are arranged adjacent to the first and second guide portions along a transversal direction that is perpendicular to the longitudinal direction and the vertical direction. Particularly preferably, the two second contact portions can be arranged symmetrically adjacent to the first and second guide portions. In other words, along the transversal direction, one of the two second contact portions is arranged on one side and the other of the two second contact portions is arranged on the other side of the second guide portion. In the longitudinal and vertical directions, the positions of the two second contact portions can coincide in a symmetrical arrangement. The second contact portions can preferably be connected directly to the second guide portion.

The second contact element can preferably have a smaller length in the longitudinal direction than the first contact element, the length being particularly preferably measured from an outer surface of a housing portion of a housing from which the contact arrangement protrudes. This can also mean that the first contact portion is further away from said outer surface in the longitudinal direction than the two second contact portions.

According to a further embodiment, the first and second contact elements can be electrically conductively and mechanically connected to electrical connection points of another component by means of welding. For this purpose, each of the contact portions, i.e., the first contact portion and the second contact portions, has a welding zone. In particular, this can also mean that the contact arrangement, i.e., the first and second contact elements, is free of contact points for screw contacts.

In particular, welding can be laser welding. Here, a welded connection, i.e., a welded joint, is produced by means of the laser welding process in that areas of contact elements, in particular welding zones that are arranged in direct contact with connection points, are at least partially melted by means of a laser beam. The laser beam of the laser welding process, which is generated for example by a solid-state laser or a gas laser, can preferably provide a concentrated heat source that allows narrow, deep welding points and a high welding rate. Preferably, a high power density, for example in the order of 1 $MW/cm^2$, can be used, resulting in small heat-affected zones and high heating and cooling rates. The spot size of the laser beam can, for example, be in the order of 100 μm or even smaller. The welding time can preferably be in the range of 0.1 seconds. The penetration depth is typically proportional to the power and power density provided, but can also depend on the location of the focal point. Typically, the penetration depth can be maximized if the focal point is slightly below the surface closest to the laser source. A continuous or pulsed laser beam can be used depending on the contact elements that are to be directly connected to each other by the laser welding process, in particular depending on their respective dimensions and materials. The laser pulses can have a length in the order of milliseconds, for example.

For example, the laser welding process can produce welds in the form of a spot-shaped, linear or, particularly preferably, crescent-shaped welded joint. This means that when viewed in a plan view from the side from which the laser beam is applied, the weld can have a shape similar to a C, a crescent or a crescent moon. In other words, the weld can have the shape of an arc with an at least partially circular or elliptical shape. Furthermore, for example, a weld can also be produced in the form of a double crescent, which is formed by two interlocking crescents.

As an alternative to a laser welding process, another welding process may also be possible. For example, resistance welding may also be possible.

The first and second contact portions can be embodied in such a way that they not only have welding zones but also hold-down zones. In particular, a hold-down zone can be an area over which a contact portion can be pressed against the external connection point of another component to be welded to the contact portion by means of a suitable hold-down part or tool.

According to a further embodiment, the welding zone of the first contact portion has a first surface area. The welding zones of the second contact portions together have a second surface area. Particularly preferably, the first and second area sizes are the same or at least substantially the same. In particular, this can mean that the second area size deviates from the first area size by at most 30% or at most 20% or at most 10%. If F1 is the first surface area and F2 is the second surface area, the said deviation dF can in particular mean $|F1-F2|/F1 \leq dF$ with dF=0.3 or 0.2 or 0.1. Furthermore, it is also possible that the second contact portions together have an area size f2 that is correspondingly equal or essentially equal to the area size f1 of the first contact portion, i.e. $|f1-f2|/f1 \leq df$ with df=0.3 or 0.2 or 0.1 applies.

According to a further embodiment, the first contact element is formed plane in a first plane. Alternatively or additionally, the second contact element can also be formed plane in a second plane parallel to the first plane. In other words, both contact elements can be plane and arranged parallel to each other. Furthermore, it is also possible that the first guide portion is formed plane in a first plane and the second guide portion is formed plane in a second plane parallel to the first plane, wherein the first contact portion can be formed plane in the second plane or the second contact portions can be formed plane in the first plane. In particular, this can mean that one of the contact elements has at least one bead or embossing and thus at least one step in order to bring the contact portion or portions into the plane of the other contact element.

In particular, the first and second contact elements can each have a metal sheet with one or more metals. The metal sheet may, for example, comprise copper or a copper alloy or be made of copper. Furthermore, the first contact element can have a coating at least in the first guide portion and/or the second contact element can have a coating in the second guide portion, which can, for example, have one or more metals selected from tin, silver and gold. Furthermore, the contact portions of the contact elements can also partially have a coating, wherein the welding zones of the contact portions of the first and second contact element are particularly preferably each free of coatings.

Furthermore, the first guide portion and/or the second guide portion can have a folded metal sheet. Such folding, which can also be referred to as doubling, can advantageously increase the current-carrying capacity of a guide portion. For example, the first contact element can have a transition portion between the first guide portion and the first contact portion, which connects the first guide portion to the first contact portion and which has a lower current-carrying capacity than the first guide portion and the first contact portion. The transition portion may, for example, have a smaller cross-sectional area in a portional plane perpendicular to the longitudinal direction than the first guide portion and the first contact portion respectively.

According to a further embodiment, an insulating element is arranged between the first guide portion and the second guide portion. In particular, the insulating element can be located in the vertical direction between the first and second guide portions. In other words, the first guide portion, the insulating element and the second guide portion can be arranged vertically one above the other or one below the other in this order.

The insulating element can particularly preferably be in direct mechanical contact with the first and second guide portions. The insulating element can, for example, have or be formed from an electrically insulating plastic film, for example with or made of polyimide and/or polypropylene. In particular, the film can be embodied plane.

Furthermore, the insulating element can project beyond the first and second guide portions in the transversal direction on both sides and thus be wider than the guide portions. Furthermore, the insulating element can project beyond the second contact element in the longitudinal direction and thus be longer than the second contact element.

In addition, it is also possible for the insulating element to be formed by a U-shaped plastic part, which is arranged between the first and second guide portions and projects beyond the guide portions on both sides in the transversal direction and extends on both sides adjacent to the first and/or second guide portion in the vertical direction. The insulating element can end at the same height as the relevant guide portion in the vertical direction or even protrude beyond it in the vertical direction.

According to a further embodiment, the contact arrangement has an inductance of less than or equal to 5 nH. This can be achieved in particular by the first and second contact elements overlapping with the first and second guide portions and, particularly preferably, only the contact portions essentially not overlapping.

BRIEF DESCRIPTION OF THE DRAWINGS

Further advantages, advantageous embodiments and further developments are revealed by the embodiments described below in connection with the figures.

Figure 1A:
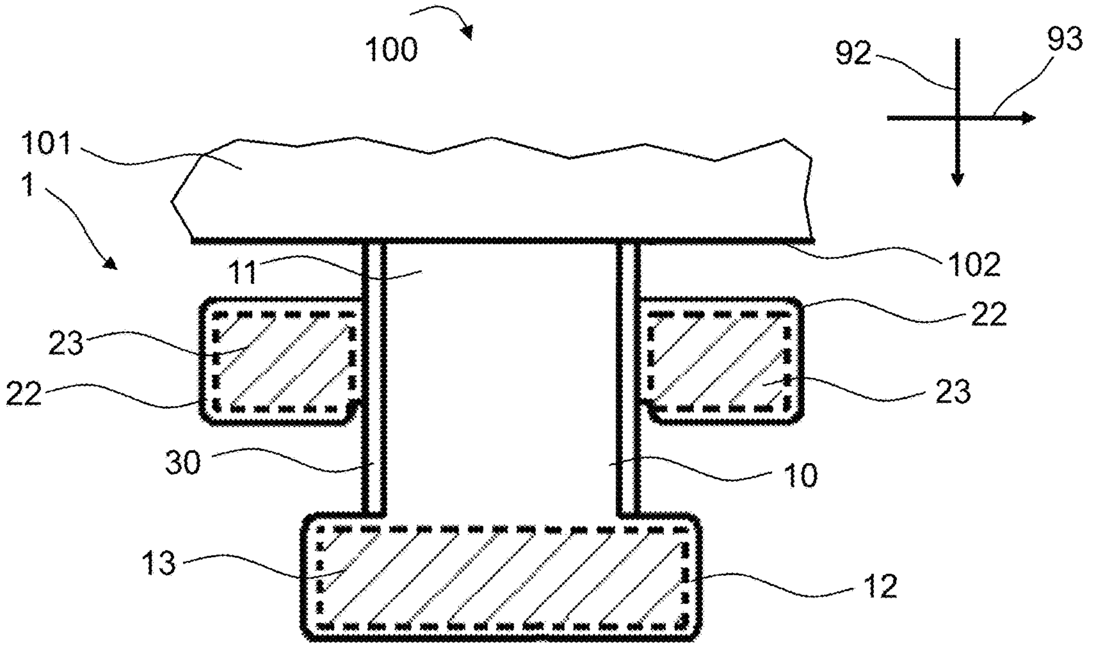
FIGS. 1A to 1D show a schematic illustration of a contact arrangement of an electrical component according to an embodiment.

In the embodiments and figures, identical, similar or identically acting elements are provided in each case with the same reference numerals. The elements illustrated and their size ratios to one another should not be regarded as being to scale, but rather individual elements, such as for example layers, components, devices and regions, may have been made exaggeratedly large to illustrate them better and/or to aid comprehension.

DETAILED DESCRIPTION OF ILLUSTRATIVE EMBODIMENTS

FIGS. 1A to 1D show several views of an embodiment of a contact arrangement 1 of an electrical component 100. Depending on the viewing direction, the vertical direction 91, the longitudinal direction 92 and the transversal direction 93 are indicated in the figures.

The electrical component 100 shown only in sections in FIGS. 1A to 1D can, for example, comprise or be at least one capacitor and/or a filter element. For example, the capacitor may be an intermediate circuit capacitor based on a film, aluminum or ceramic technology or a hybrid technology, for example an aluminum/film technology. The filter element can be an EMI filter, for example, or at least components of a filter. Furthermore, interference suppression components installed on or attached to a busbar and other passive components are also possible, for example.

The contact arrangement 1 is intended and configured for electrical contacting of the electrical component 100, i.e., for electrical connection of the electrical component 1 to a further component. An example of such an electrical connection to a further electrical component is described below in conjunction with FIGS. 6A to 6E. In particular, it is also particularly preferable that a mechanical fastening of the electrical component 100 is achieved via the contact arrangement 1. Even if only one contact arrangement 1 is shown in FIGS. 1A to 1D, the electrical component 100 can have one or more contact arrangements 1, which can preferably be designed in the same way and via which the electrical component 100 can be connected to one or more further electrical components.

Figure 1B:
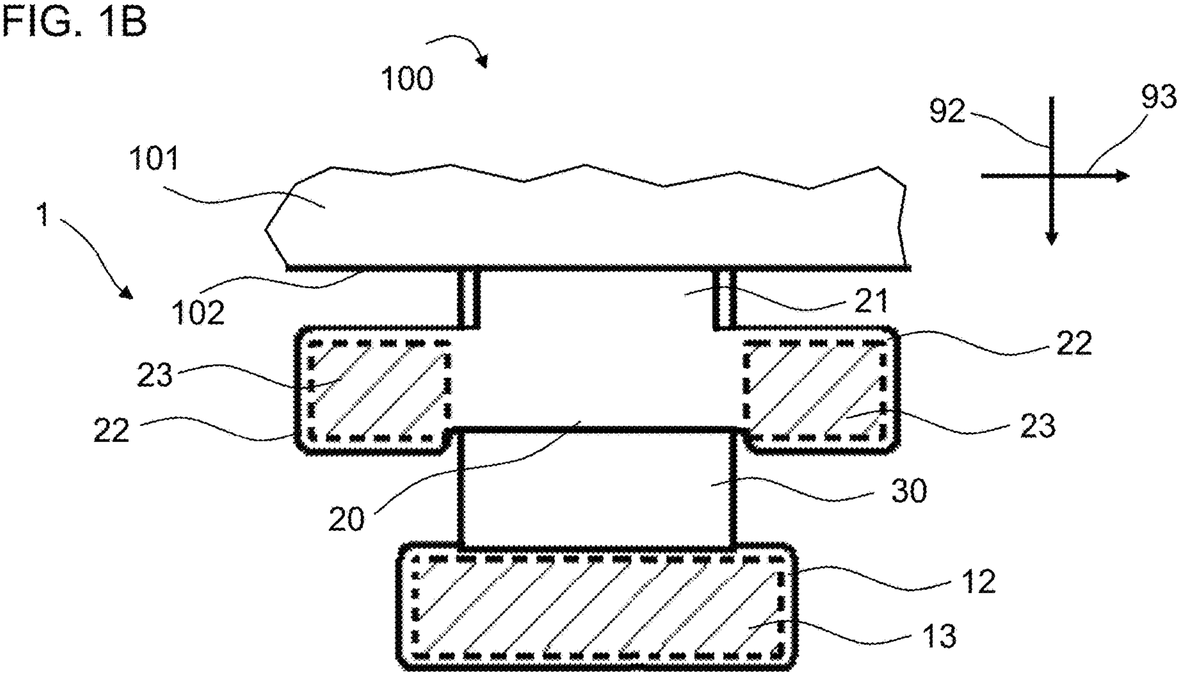
Figure 1C:
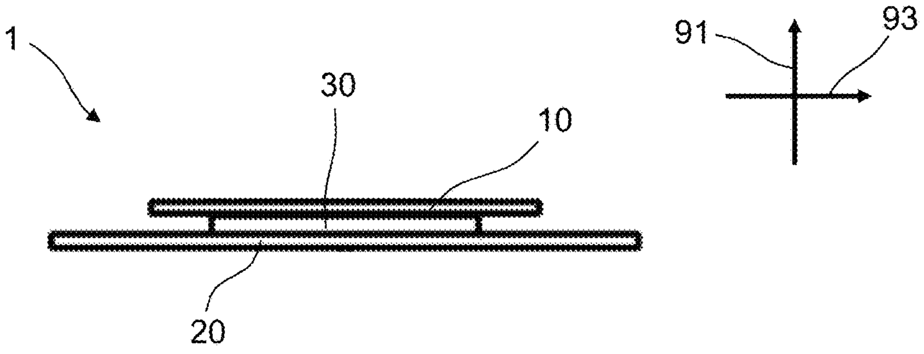
Figure 1D:
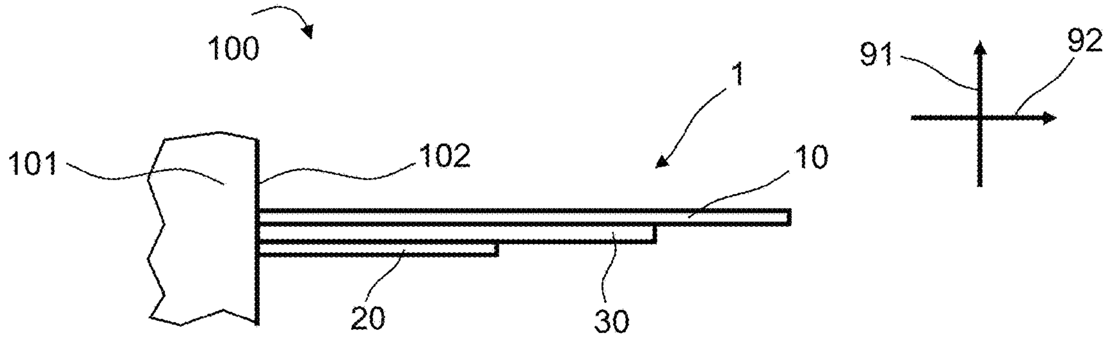

The contact arrangement 1 comprises a first contact element 10 and a second contact element 20, which protrude from a housing portion of a housing 101. FIG. 1A shows a view of the contact arrangement 1 from a vertical direction towards the first contact element 10, while FIG. 1B shows a view of the contact arrangement 1 from the opposite vertical direction towards the second contact element 20. FIG. 1C shows a view of the contact arrangement 1 as seen along the longitudinal direction towards the housing, while FIG. 1D shows a view of the contact arrangement 1 in the vertical direction. The following description refers equally to FIGS. 1A to 1D.

The first contact element 10 comprises a first guide portion 11 and a first contact portion 12. The second contact element 20 comprises a second guide portion 21 and two second contact portions 22. The contact elements 10, 20 can be mechanically and electrically conductively connected to an external connection point, in particular an electrical connection point of another component, via the contact portions 12, 22. For this purpose, the contact portions 12, 22 of the contact elements 10, 20 are particularly preferably arranged outside the housing 101 of the electrical component 100, as shown. Via the respective guide portion 11, 21, the associated contact portion or portions 12, 22 of each of the contact elements 10, 20 can be connected, for example within the housing 101, to one or more further components of the electrical component 100. The guide portion 11, 21 of each of the contact elements 10, 20 can particularly preferably be arranged at least partially outside the housing 101 of the electrical component 100, as shown.

The first and second contact elements 10, 20 are arranged one above the other in the vertical direction 91, so that in particular the first and second guide portions 11, 21 lie one over the other and at least partially overlap in the vertical direction 91. Particularly preferably, one of the guide portions 11, 21 can completely overlap the other. In the contact arrangement 1 shown, the first guide portion 11 completely covers the second guide portion 21 along the vertical direction 91 in the viewing direction of the contact arrangement 1 shown in FIG. 1A.

The first contact portion 12 follows the first guide portion 11 along the longitudinal direction 92 and is directly connected to the first guide portion 11 in the contact arrangement 1 shown. Alternatively, as described, for example, in connection with FIGS. 3A to 3C, there may also be a transition portion between the first guide portion 11 and the first contact portion 12.

The spatial arrangement of the first guide portion 11 and the first contact portion 12 connected thereto defines the longitudinal direction 92, which can preferably be perpendicular to the housing portion of the housing of the electrical component or its outer surface 102, from which the contact arrangement 1 protrudes, as shown.

The two second contact portions 22 of the second contact element 20 are arranged along the transversal direction 93, which is perpendicular to the longitudinal direction 92 and the vertical direction 91, next to the first and second guide portions 11, 21, wherein, as shown, the two second contact portions 22 are particularly preferably arranged symmetrically next to the first and second guide portions 11, 21. Accordingly, along the transversal direction 93, one of the two second contact portions 22 is arranged on one side and the other of the two second contact portions 22 is arranged on the other side of the second guide portion 21, wherein in the longitudinal direction 92 and vertical direction 91 the positions of the two second contact portions 22 coincide in the symmetrical arrangement shown. As shown, the second contact portions 22 can preferably be connected directly to the second guide portion 21.

The second contact element 20 comprises a smaller length in the longitudinal direction 92, starting from the outer surface 102 of the housing portion of the housing 101 of the electrical component 100, than the first contact element 10, so that the first contact portion 11 is further away from the outer surface 102 in the longitudinal direction than the two second contact portions 22.

The contact arrangement 1 is intended and configured to be connected to another component by means of welding. Accordingly, the contact arrangement 1 is free of screw connections or parts thereof. Each of the contact portions 12, 22 of the contact elements 10, 20 comprises a respective welding zone 13, 23 in which at least one welding point is produced as part of a welding process, as described, for example, in connection with FIGS. 6A to 6E.

Furthermore, the first and second contact portions 12, 22 not only comprise welding zones 13, 23 but also hold-down zones, i.e., areas via which the contact portions can be pressed against the external connection point of a further component to be welded to the contact portions by means of a suitable hold-down part or tool. For example, in the contact arrangement 1 shown, the hold-down zones can be provided in edge areas of the contact portions 12, 22, which surround the welding zones 13, 23. Furthermore, hold-down zones can also be provided, for example, within the identified welding zones 13, 23 or, in the case of the second contact element 20, in the transversal direction 93 between the welding zones 23.

The welding zone 13 of the first contact portion 12 comprises a first surface area F1, while the welding zones 23 of the second contact portions 22 together have a second surface area F2. Particularly preferably, the first surface area F1 and the second surface area F2 are the same or at least substantially the same. In particular, the second area size F2 may deviate from the first area size F1 by at most 30% or at most 20% or at most 10%, as described above in the general part. Furthermore, it may also be possible that the second contact portions 22 together have an area size f2 which is to a corresponding extent equal to or substantially equal to the area size f1 of the first contact portion 12 and thus deviates from the first area size f1 by at most 30% or at most 20% or at most 10%.

As can be seen in FIGS. 1C and 1D, the first contact element 10 is formed plane in a first plane, while the second contact element 20 is formed plane in a second plane parallel to the first plane, so that both contact elements 10, 20 are each formed plane and arranged parallel to one another.

In particular, the first and second contact elements 10, 20 can each comprise a metal sheet with one or more metals. The metal sheet may, for example, comprise copper or a copper alloy or be made of copper. Furthermore, the first contact element 10 can comprise a coating (not shown) at least in the first guide portion 11 and/or the second contact element 20 can comprise a coating (not shown) in the second guide portion 21, which can, for example, comprise one or more metals selected from tin, silver and gold. Furthermore, the contact portions 12, 22 of the contact elements 10, 20 may also partially comprise a coating (not shown), wherein the welding zones 13, 23 of the contact portions 12, 22 of the first and second contact elements 10, 20 are particularly preferably each free of any coatings.

Furthermore, an insulating element 30 is arranged between the first guide portion 11 and the second guide portion 21. The insulating element 30 can be located in particular in the vertical direction 91 between the first and second guide portions 11, 21, so that the first guide portion 11, the insulating element 30 and the second guide portion 21 are arranged in this order one above the other or one below the other in the vertical direction 91.

The insulating element 30 is particularly preferably in direct mechanical contact with the first and second guide portions 11, 21 and can, for example, comprise or be formed from an electrically insulating plastic film, for example with or made of polyimide and/or polypropylene. In particular, the film can be plane and inserted between the contact elements 10, 20. In order to reduce the risk of leakage currents, the insulating element 30 can, as can be seen in FIGS. 1A and 1B, project beyond the first and second guide portions 11, 21 on both sides in the transversal direction 93 and thus be wider than the guide portions 11, 21. Furthermore, the insulating element 30 can project beyond the second contact element 20 in the longitudinal direction 92 and thus be longer than the second contact element 20, as can be seen in FIG. 1D. The first contact element 10, in turn, is longer than the insulating element in the longitudinal direction 92, wherein in particular the first contact portion 12 or at least the welding zone 13 of the first contact portion 12 projects beyond the insulating element 30 in the longitudinal direction.

For example, in a specific embodiment, the contact elements 10, 20 can each comprise a copper sheet with a thickness of approximately 1 mm in the vertical direction 91, which is provided with a coating, wherein the welding zones 13, 23 are free of coatings on both sides and are thus uncoated and each have bare copper surfaces on both sides. The welding zone 13 of the first contact portion 12 can, for example, have a width of 20 mm to 28 mm in the transversal direction 93 and a length of 7 mm in the longitudinal direction 92, while each of the welding zones 23 of the second contact portions 22 can each have a width of 10 mm and a length of 7 mm. The edge regions surrounding the welding zones 13, 23 may each have a width of 1 mm, for example. In the longitudinal direction 92, the first contact element 10, calculated from the outer surface 102 of the housing 101, can have a length of approximately 29 mm, for example, while the second contact element 20 can have a corresponding length of approximately 13 mm. Due to the structure shown, it can be achieved that the contact arrangement 1 has an inductance of less than or equal to 5 nH and thus an apparent inductance which is considerably lower compared to conventional connection lugs. By providing welding zones 13, 23 and the associated possibility of connecting the contact arrangement 1 to external connection points by means of welded joints, an extremely low contact resistance can be achieved.

Figure 2A:
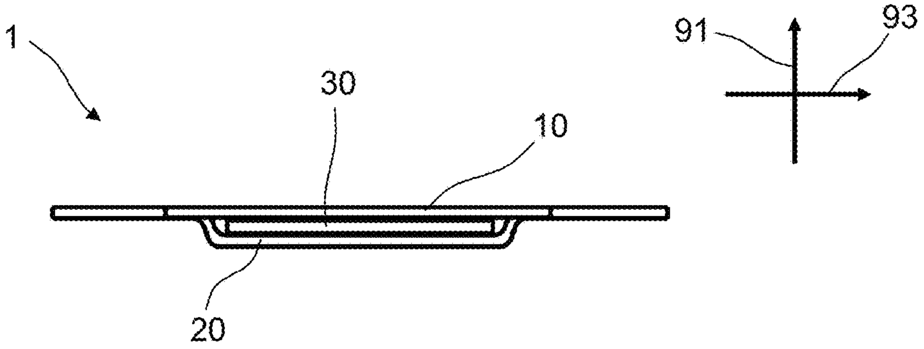
FIGS. 2A and 2B show schematic illustrations of a contact arrangement according to further embodiments.
Figure 2B:
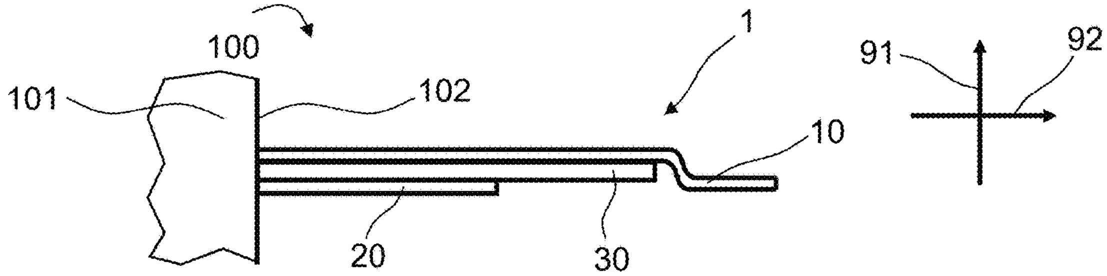

FIGS. 2A and 2B show schematic illustrations of the contact arrangement 1 according to further embodiments, which form modifications of the contact arrangement 1 shown in FIGS. 1A to 1D. In comparison to the contact arrangement 1 shown in FIGS. 1A to 1D, it is possible that the first guide portion 11 is formed plane in a first plane and the second guide portion 21 is formed plane in a second plane parallel to the first plane, while the first contact portion 12 and the second contact portions 22 are each formed plane in the first plane, as shown in FIG. 2A, or the first contact portion 12 and the second contact portions 22 are each formed plane in the second plane, as shown in FIG. 2B. For this purpose, the corresponding contact element 10, 20 can comprise at least one bead or embossing and thus at least one step, as can be seen in FIGS. 2A and 2B, in order to bring the second contact portions 22 into the plane of the first contact element 10 or the first contact portion 12 into the plane of the second contact element 20. By arranging the first and second contact portions 12, 22 in the same plane, a further electrical component can, for example, be formed with connection points arranged in the same plane and thus have a plane contact zone, which can, for example, make production easier.

Figure 3A:
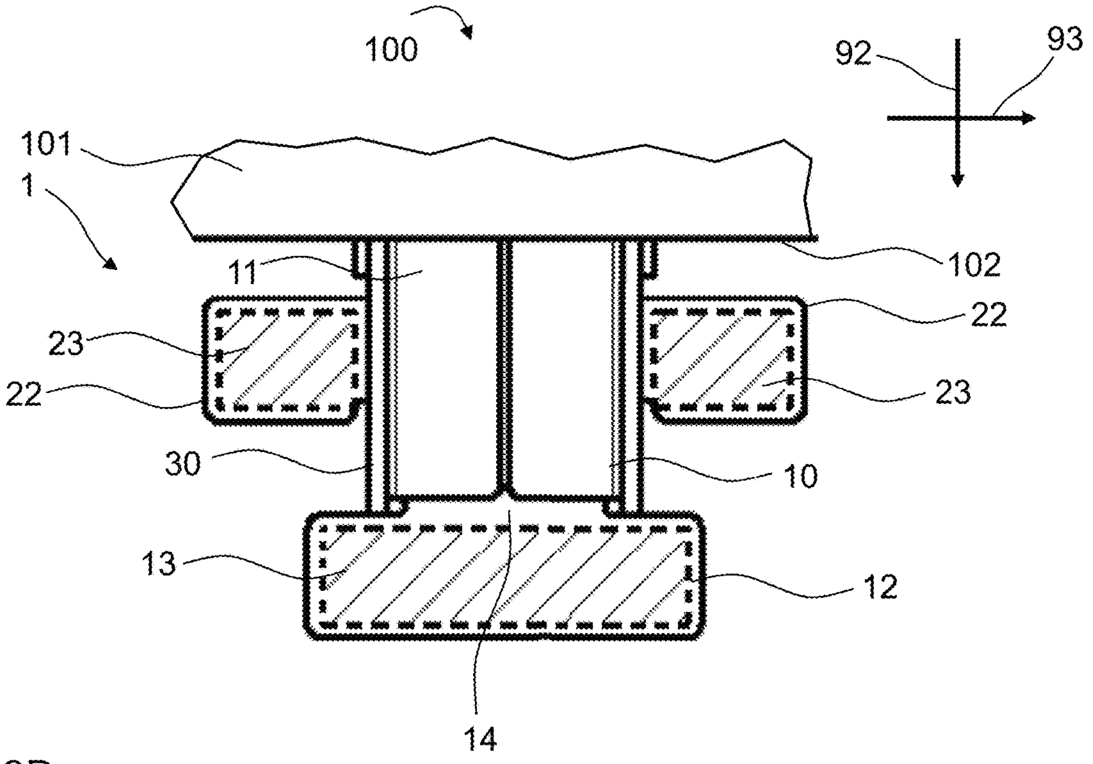
FIGS. 3A to 3C show schematic illustrations of a contact arrangement of an electrical component according to a further embodiment.
Figure 3B:
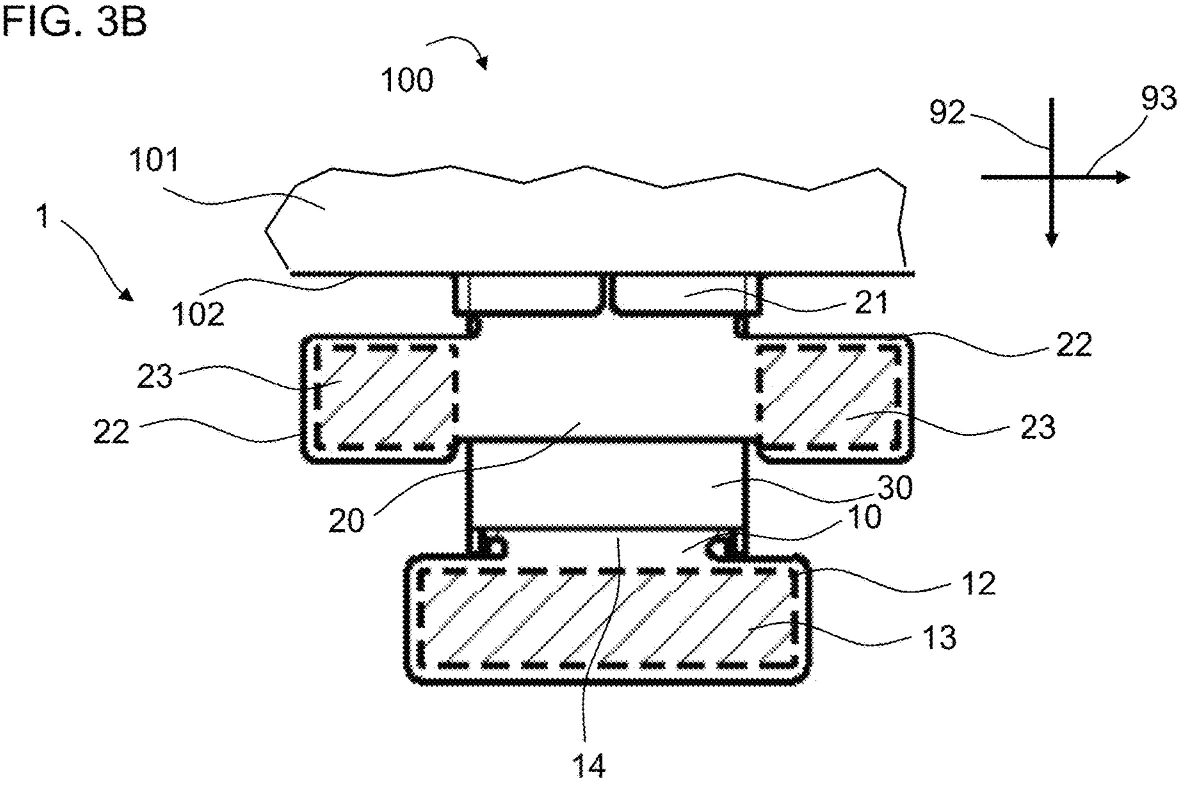
Figure 3C:
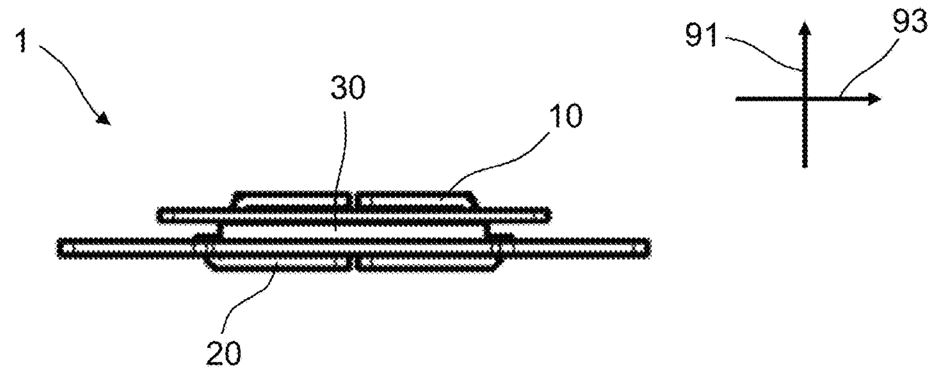

FIGS. 3A to 3C show schematic illustrations of the contact arrangement 1 according to a further embodiment. In comparison to the previous embodiments, in the contact arrangement 1 shown in FIGS. 3A to 3C, the first guide portion 11 and the second guide portion 21 each have a folded metal sheet. The folded guide portions 11, 21 are produced, for example, by doubling the width of the plane metal sheets used for production in the area of the guide portions 11, 21 compared to the later width of the guide portions 11, 21. By symmetrical folding, the lateral edges are brought together so that they meet in the middle. In other words, the guide portions 11, 21 of the first and second contact elements 10, 20 shown in FIGS. 3A to 3C have a substantially doubled cross-sectional area compared to the previous embodiments, so that such folding or doubling, which is preferably symmetrical as shown, can advantageously increase the current carrying capacity of the guide portions 11, 21 in each case. Particularly preferably, if the folded guide portions 11, 21 were folded back again, the width of these along the transversal direction 93 can correspond to the width of the second contact portion 22.

Furthermore, the first contact element 10 can comprise a transition portion 14 between the first guide portion 11 and the first contact portion 12, which connects the first guide portion 11 to the first contact portion 12 and which has a lower current carrying capacity than the first guide portion 11 and the first contact portion 12. The transition portion 14 can have a smaller width in the transversal direction 93 and thus a smaller cross-sectional area in a sectional plane perpendicular to the longitudinal direction 92 than the first guide portion 11 and the first contact portion 12, respectively. However, because the transition portion 14 has a very small length in the longitudinal direction 92, it can be achieved that no detrimental heat generation takes place in the transition portion 14.

Figure 4A:
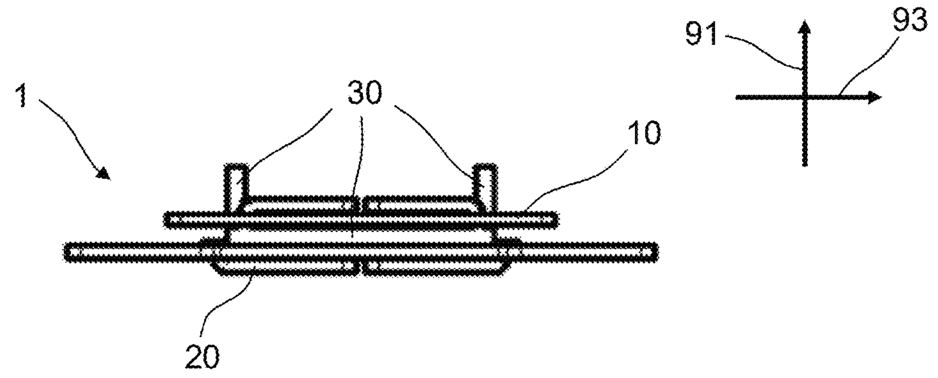
FIGS. 4A and 4B show schematic illustrations of a contact arrangement of an electrical component according to a further embodiment.
Figure 4B:
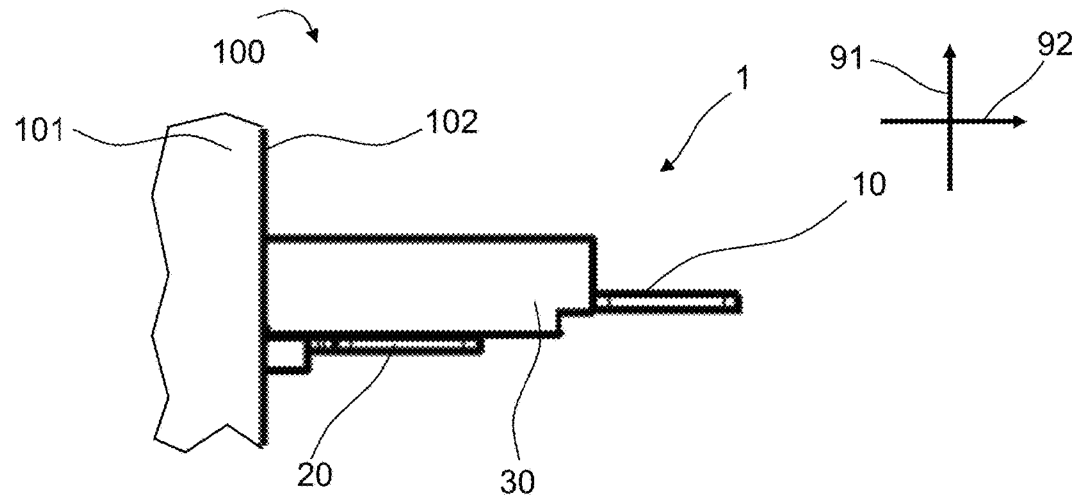

FIGS. 4A and 4B show schematic illustrations of the contact arrangement 1 according to a further embodiment, in which, in comparison to the previous embodiments, the insulating element 30 is formed by a U-shaped plastic part instead of a film. The U-shaped insulating element 30 can, for example, be made of polypropylene and, like the plastic film shown above, is arranged between the first and second guide portions 11, 21 and projects beyond the guide portions 11, 21 on both sides in the transversal direction 93. Furthermore, the insulating element 30 has side webs which extend on both sides next to the first guide portion 11 in the vertical direction 91. In this case, the insulating element 30 can end in the vertical direction 91 with the side webs at the same height as the first guide portion 11 or, as can be seen in FIGS. 4A and 4B, project beyond it in the vertical direction 91. Such a U-shaped design of the insulating element 30 can considerably extend possible leakage current paths, particularly at the sides of the contact elements 10, 20.

The features of the contact arrangement 1 described in connection with FIGS. 1A to 4B can also be combined with each other, even if not all combinations are shown in the figures.

Figure 5A:
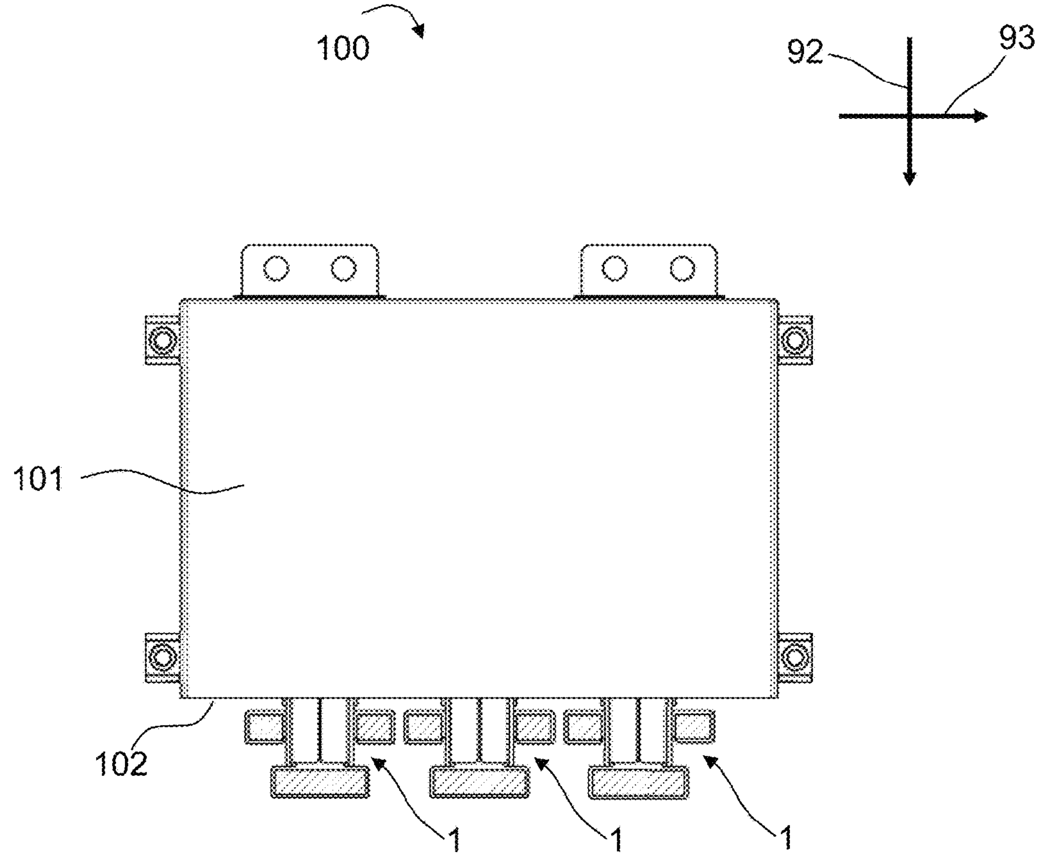
FIGS. 5A to 5C show schematic illustrations of an electrical component according to a further embodiment.
Figure 5B:
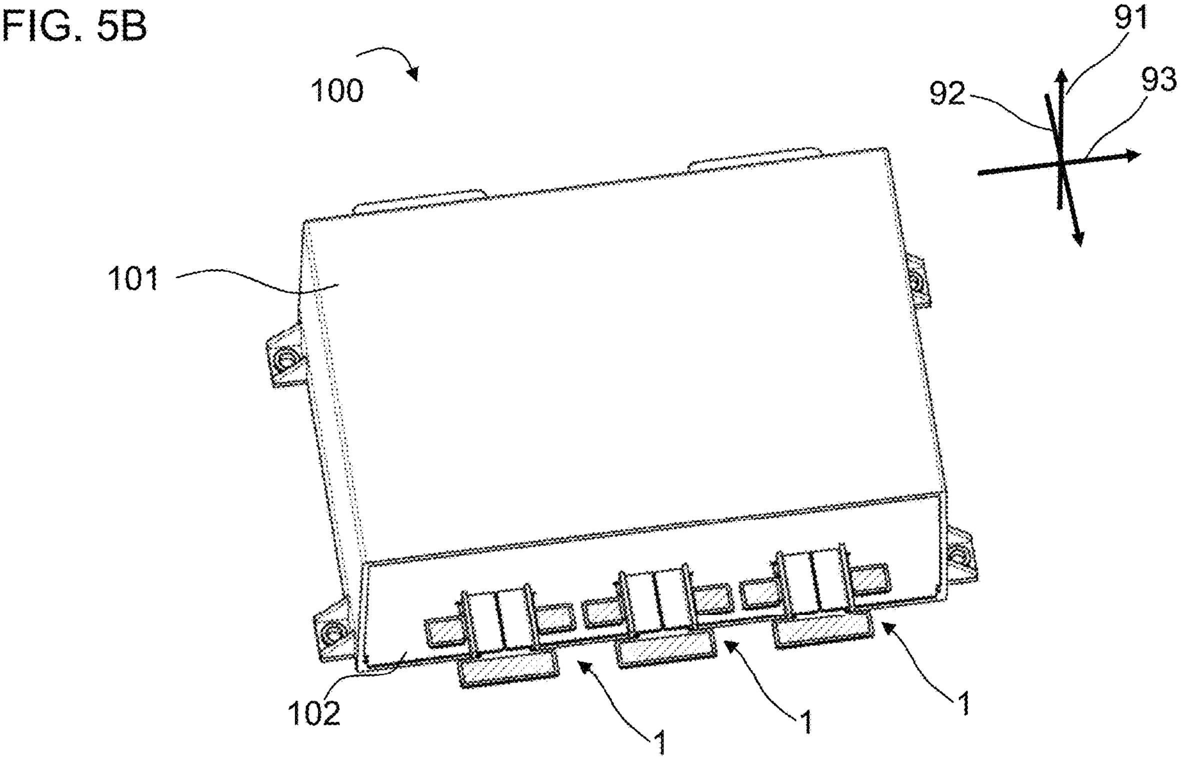
Figure 5C:
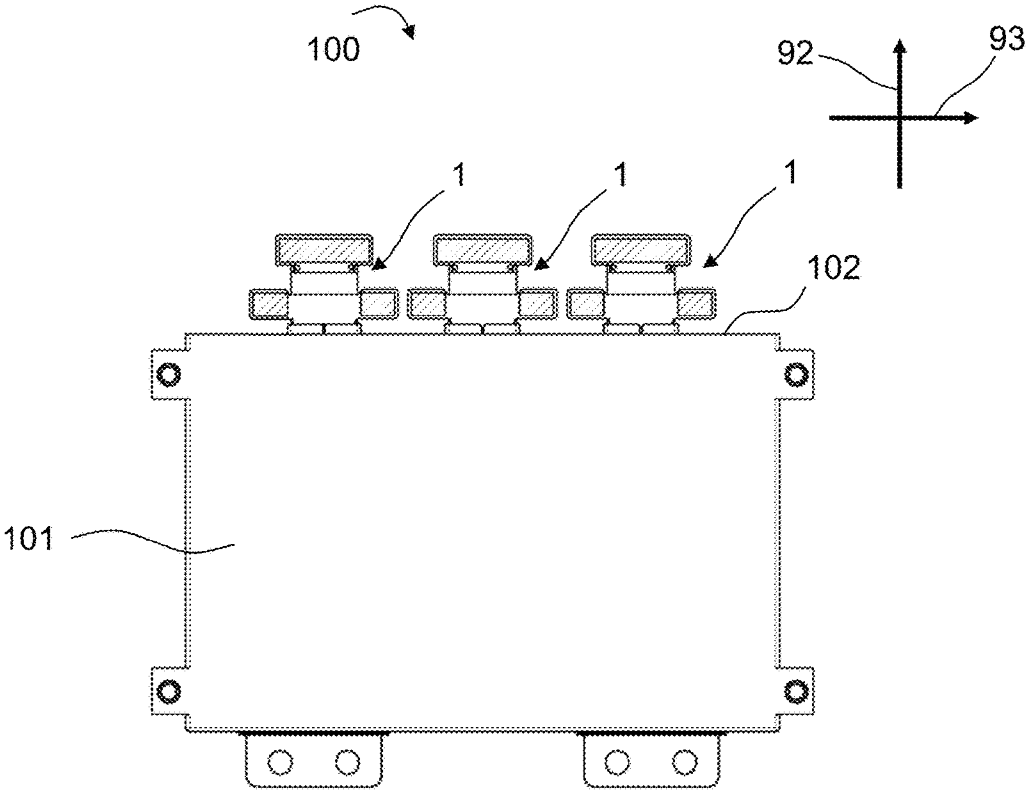

FIGS. 5A to 5C show schematic illustrations of an electrical component 100 according to a further embodiment, which is embodied purely by way of example as an intermediate circuit capacitor with three contact arrangements 1 of the same design arranged next to one another. The embodiment of the electrical component 100 shown in FIGS. 5A to 5C is not to be understood as limiting.

The contact arrangements 1 can be embodied as described above, wherein an embodiment according to FIGS. 4A and 4B is shown purely as an example. In FIG. 5A, a view along the vertical direction to the top of the electrical component 100 is shown, while in FIG. 5B a three-dimensional view and in FIG. 5C a view along the vertical direction to the bottom of the electrical component 100 are shown. One or more capacitors may be present in the housing 101, which are connected to the contact arrangements 1. By way of example only, electrical connection lugs are provided on the outer surface opposite the outer surface 102 from which the contact arrangements 1 protrude. The electrical component 100 can be attached to a support, such as a heat sink, via lugs in the underside of the housing 101. The contact arrangements 1 form a purely exemplary output side of the electrical component with, as described above, low-inductance and low-impedance electrical connections for further electrical components.

Figure 6A:
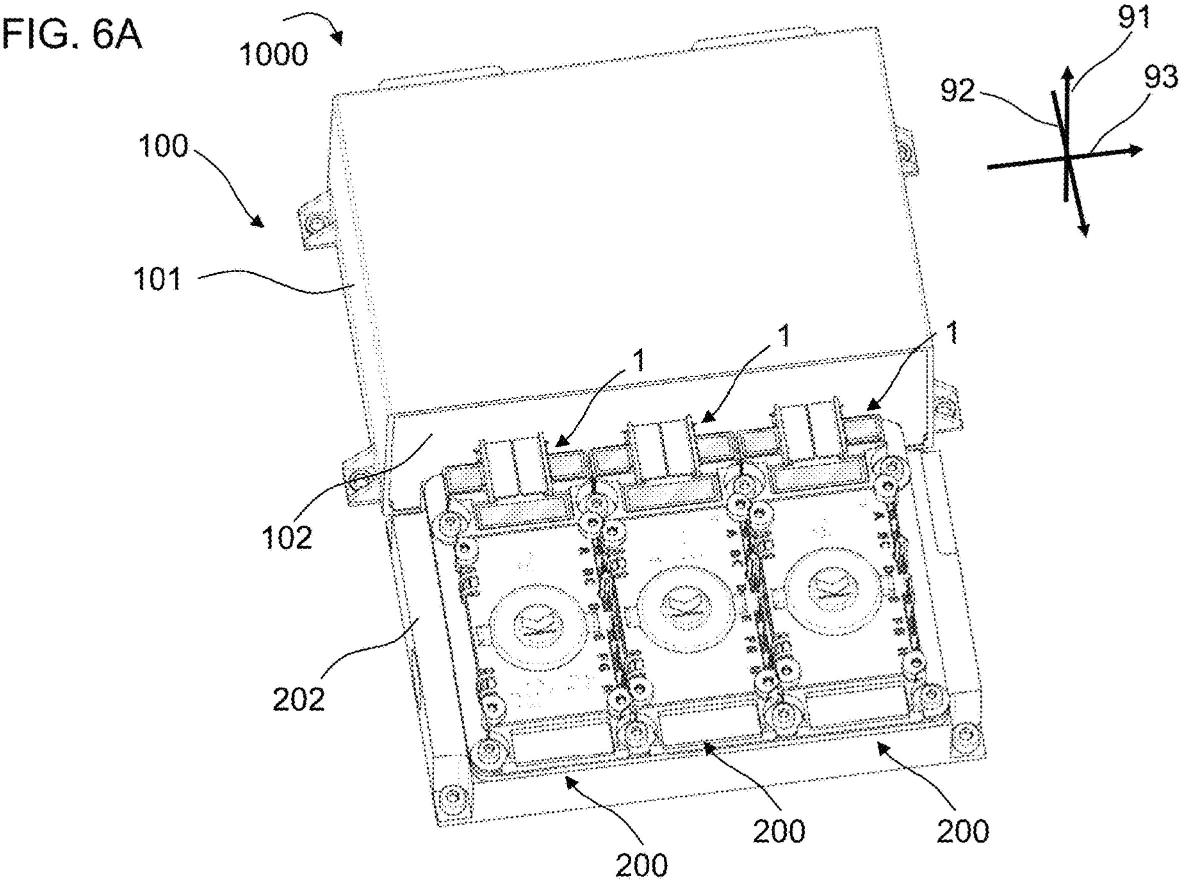
FIGS. 6A to 6E show schematic illustrations of an electrical device according to a further embodiment.
Figure 6B:
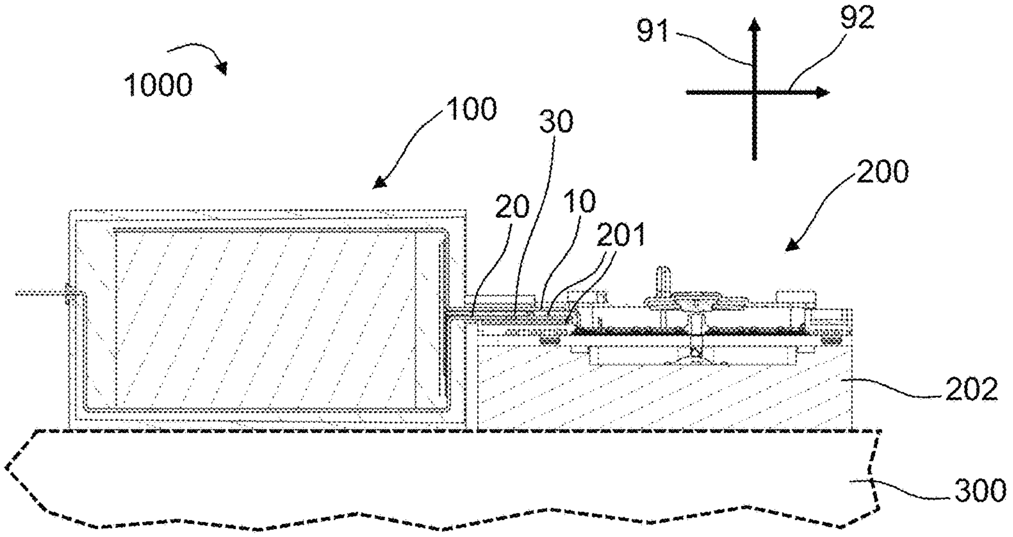
Figure 6C:
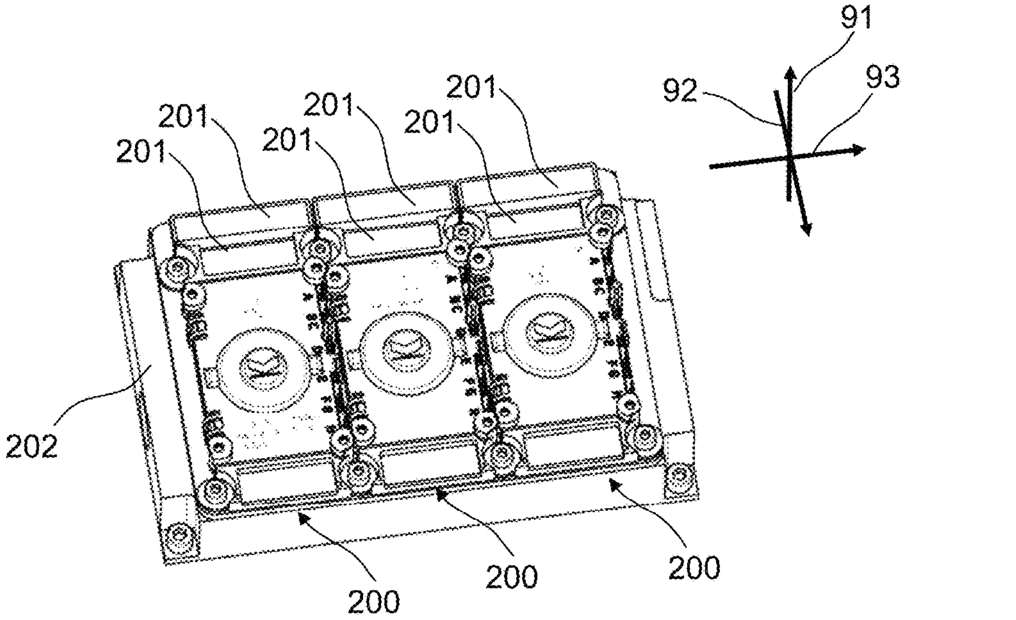
Figure 6D:
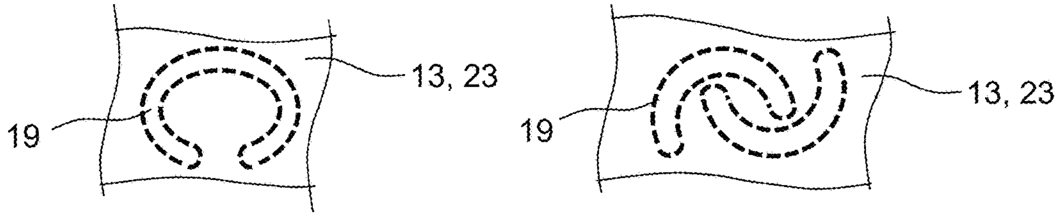
Figure 6E:
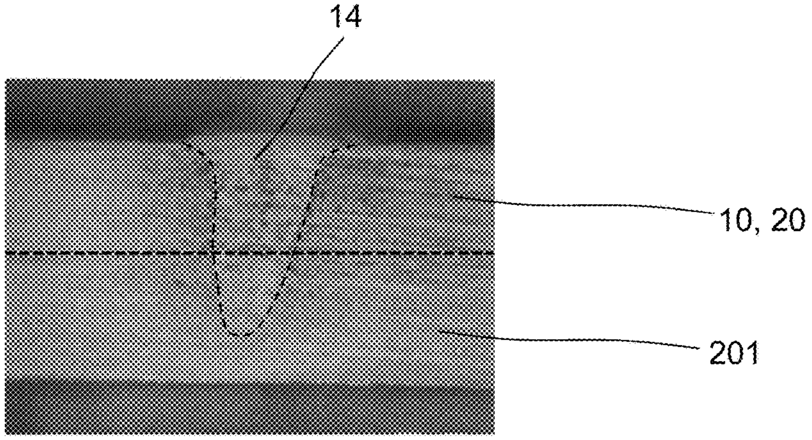

In connection with FIGS. 6A to 6E, an electrical device 1000 according to a further embodiment is shown, which comprises the electrical component 100 according to FIGS. 5A and 5B as well as further electrical components 200, which are arranged on a common carrier 300, in particular a heat sink. FIGS. 6A and 6B show the electrical device 1000 in a three-dimensional view and in a sectional view, while the further electrical components 200 are shown without the electrical component 100 in FIG. 6C. FIGS. 6D and 6E show welded connections. The electrical components 100, 200 shown are to be understood as purely exemplary and not restrictive with regard to their structure and functionality.

The further electrical components 200, which are arranged on an intermediate carrier 202, can for example be semiconductor modules for generating alternating current from a direct current, as used for example in electric vehicles. The electrical device 1000 can thus be used, for example, to generate a three-phase alternating current for operating electric motors.

Each of the further electrical components 200 has two electrical connection points 201. The first contact portion of the first contact element 10 of a contact arrangement 1 is arranged on one of the connection points 201 of each of the further electrical components 200, while the second contact portions of the second contact element 20 are arranged on the respective other connection point 201. The first contact element 10 and the second contact element 20 are electrically conductively and mechanically connected to the electrical connection points 201 in the welding zones by means of welding.

A laser welding process is particularly preferred, as described in the general portion. FIG. 6D shows an example of a preferred crescent-shaped welding point 19 and an equally preferred welding point 19 in the form of a double crescent. FIG. 6E shows a photograph of a sectional view of a welding point 19 produced by laser welding, with the dashed horizontal line indicating the interface between the connection point 201 and the contact element 10 or 20. Furthermore, the part melted by the laser welding, which forms the welding point 14, is highlighted by a dashed line for better recognizability. As described in the general part, the shape of the welding point 19 and the welding depth can be easily adjusted using the laser welding process. Alternatively, a welding point can also be formed in the shape of a spot or line and/or a different welding process can be used.

Compared to hitherto existing connection solutions, in which plus and minus connections are routed next to each other, which leads to an increased apparent inductance with values in the range of more than 15 nH, the contact arrangement according to the previously described embodiments uses weldable, superimposed contact elements. In particular, these also replace very complex screw solutions. The suitably matched contact elements, in which the current paths lie one over the other for as far as possible, reduce both the apparent inductance and the series resistance to a minimum, wherein the inductance can have values in a range of less than 5 nH and, for example, around 3 nH. Such extremely low values also suit new so-called WBG materials (WBG: “wide band gap”), for example, which allow extreme edge steepnesses. The hitherto existing high additional apparent inductance, on the other hand, limited the current required for newly developed electric motors. Newly developed electric motors, especially for electromobility, allow significantly higher currents than before, which is possible with semiconductor modules based on WBG materials due to their extremely low ESL value and, in conjunction with the contact arrangement described, due to a low-inductance coupling.

The geometry of the contact arrangement described here can be used for DC link capacitors of various technologies (film/aluminum/ceramic or hybrid versions thereof) and also for other, e.g. passive, components such as DC link capacitors with integrated EMI filter or EMI components, EMI filter components, connection busbars, etc.

The laser welding process described is used with advantage in combination with the contact arrangement, as it introduces only little heat into the upper layers of the components and therefore does not damage them, wherein the penetration depth can be varied. In particular, space is no longer required for a complex screw connection. The contact points are located directly on the other component(s) and the space required for the hold-down tools for welding is already taken into account. Laser welding can significantly reduce contact resistance and allow perfect contact points to be produced in fractions of a second. If necessary, multiple welding points in the same space produce the highest contact reliability for extremely high currents with significantly reduced heating and the same contact area.

The contact arrangement described allows an extremely cost-effective and optimized connection of electrical components of various designs, especially on new, low-inductance semiconductor modules. The overlapping contact elements are preferably embodied in such a way that they can transmit a wide range of power without excessive heating occurring.

The contact arrangement can advantageously fulfill all mechanical and electrical requirements for the connections, in particular, for example, current carrying capacity, vibration resistance, tensile strength, low-inductive/low-resistance connection, low heating even at high currents, insulation resistance for both clearance and creepage distances as well as mechanical requirements with regard to (co-) planarity, air gaps, additional recesses in the contact elements. As described above, the contact elements can also be manufactured without a height-compensating press-fit bead, which can reduce costs.

The features and embodiments described in connection with the figures can be combined with one another according to further embodiments, even if not all combinations are explicitly described. Furthermore, the embodiments described in connection with the figures may alternatively or additionally have further features as described in the general part.

The invention is not limited by the description based on the embodiments to these embodiments. Rather, the invention includes each new feature and each combination of features, which includes in particular each combination of features in the patent claims, even if this feature or this combination itself is not explicitly explained in the patent claims or embodiments.

The invention claimed is:

1. A contact arrangement for an electrical component comprising:

a first contact element with a first guide portion and a first contact portion; and a second contact element with a second guide portion and two second contact portions, wherein the first and second guide portions lie one over the other, overlap in a vertical direction, and extend along a longitudinal direction perpendicular to the vertical direction, wherein the first contact portion follows the first guide portion in the longitudinal direction, and wherein the two second contact portions are arranged adjacent to the first and second guide portions symmetrically along a transversal direction that is perpendicular to the longitudinal direction and to the vertical direction.

2. The contact arrangement according to claim 1, wherein each of the first contact portion and the second contact portions comprises a welding zone.

3. The contact arrangement according to claim 2, wherein the welding zone of the first contact portion has a first area size and the welding zones of the second contact portions together have a second area size, the second area size deviating from the first area size by less than 30%.

4. The contact arrangement according to claim 1, wherein the first contact element is planar in a first plane and the second contact element is planar in a second plane parallel to the first plane.

5. The contact arrangement according to claim 1, wherein the first guide portion is arranged planar in a first plane, the second guide portion is arranged planar in a second plane parallel to the first plane, and the first and the second contact portions are arranged planar in the first plane or the second plane.

6. The contact arrangement according to claim 1, wherein the first and second contact elements comprise a metal sheet.

7. The contact arrangement according to claim 6, wherein the first guide portion and/or the second guide portion comprises a folded metal sheet.

8. The contact arrangement according to claim 6, wherein the metal sheet comprises copper.

9. The contact arrangement according to claim 6, wherein the first contact element in the first guide portion and/or the second contact element in the second guide portion comprise a coating.

10. The contact arrangement according to claim 6, wherein the first and second contact portions are at least partially free of any coatings.

11. The contact arrangement according to claim 1, wherein the first contact element comprises a transition portion between the first guide portion and the first contact portion, the transition portion connecting the first guide portion to the first contact portion and having a lower current carrying capacity than the first guide portion and the first contact portion.

12. The contact arrangement according to claim 1, further comprising an insulating element arranged between the first guide portion and the second guide portion.

13. The contact arrangement according to claim 12, wherein the insulating element is an electrically insulating plastic film.

14. The contact arrangement according to claim 12, wherein the insulating element is a U-shaped plastic part, which protrudes between the first and second guide portions on both sides in the transversal direction and which extends next to the first guide portion and/or the second guide portion in the vertical direction.

15. The contact arrangement according to claim 12, wherein the insulating element is in direct mechanical contact with the first and second guide portions.

16. The contact arrangement according to claim 1, wherein the contact arrangement has an inductance of less than or equal to 5 nH.

17. The electrical component comprising:

at least one contact arrangement according to claim 1.

18. The electrical component according to claim 17, wherein the electrical component comprises at least one capacitor and/or one filter element.

19. An electrical device comprising:

at least one electrical component according to claim 17; and at least one further electrical component, which has electrical connection points which are mechanically and electrically connected to the first contact portion and the second contact portions of the at least one contact arrangement by welded connections.

20. The electrical device according to claim 19, wherein the at least one electrical component and the at least one further electrical component are mounted on a common carrier.

* * * * *